(12) United States Patent
Bender et al.

(10) Patent No.: US 9,100,443 B2
(45) Date of Patent: Aug. 4, 2015

(54) COMMUNICATION PROTOCOL FOR VIRTUAL INPUT/OUTPUT SERVER (VIOS) CLUSTER COMMUNICATION

(75) Inventors: Carl Duane Bender, Pflugerville, TX (US); Michael Paul Cyr, Georgetown, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 13/004,184

(22) Filed: Jan. 11, 2011

(65) Prior Publication Data

US 2012/0179837 A1    Jul. 12, 2012

(51) Int. Cl.
  *G06F 15/16*      (2006.01)
  *G06F 15/173*     (2006.01)
  *G06F 9/455*      (2006.01)
  *H04L 29/06*      (2006.01)
  *H04L 29/08*      (2006.01)

(52) U.S. Cl.
  CPC ............ *H04L 69/22* (2013.01); *H04L 67/1097* (2013.01)

(58) Field of Classification Search
  None
  See application file for complete search history.

(56) References Cited

U.S. PATENT DOCUMENTS

| 8,165,136 | B1 * | 4/2012 | Sharma et al. | 370/401 |
| 2006/0075278 | A1 * | 4/2006 | Kallahalla et al. | 714/4 |
| 2006/0123024 | A1 | 6/2006 | Sathyanarayan et al. | |
| 2007/0168547 | A1 * | 7/2007 | Krywaniuk | 709/238 |
| 2008/0189468 | A1 | 8/2008 | Schmidt | |
| 2009/0063147 | A1 * | 3/2009 | Roy | 704/251 |
| 2010/0131636 | A1 * | 5/2010 | Suri et al. | 709/224 |
| 2011/0153827 | A1 * | 6/2011 | Yengalasetti et al. | 709/226 |
| 2011/0153840 | A1 * | 6/2011 | Narayana et al. | 709/227 |

* cited by examiner

*Primary Examiner* — Ninos Donabed
*Assistant Examiner* — Farrukh Hussain
(74) *Attorney, Agent, or Firm* — Yudell Isidore PLLC; Steven Bennett

(57) ABSTRACT

A first Virtual Input/Output Server (VIOS) of a VIOS cluster performs the functions of: generating, at a sending daemon of the first VIOS, a send message that is to be transmitted to a receiving daemon at a second VIOS; in response to completion of the generating of the send message, forwarding the send message to a sending virtual small computer systems interface (vscsi) kernel extension (VKE) via a system call interface; and in response to the sending VKE receiving the send message from the sending daemon, forwarding the send message to one or more second VIOSes within the VIOS cluster utilizing a kcluster interface. The sending VKE parses at least one of a message header and a sub-header of the send message; and responsive to detection of a broadcast setting for the send message, the VKE forwards the send message to all nodes within the cluster via a cluster broadcast.

19 Claims, 10 Drawing Sheets

FIG. 3
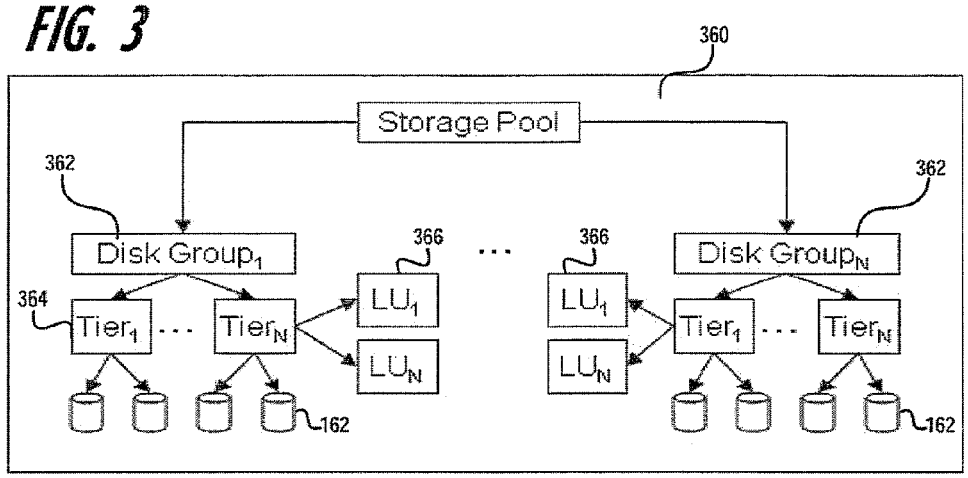
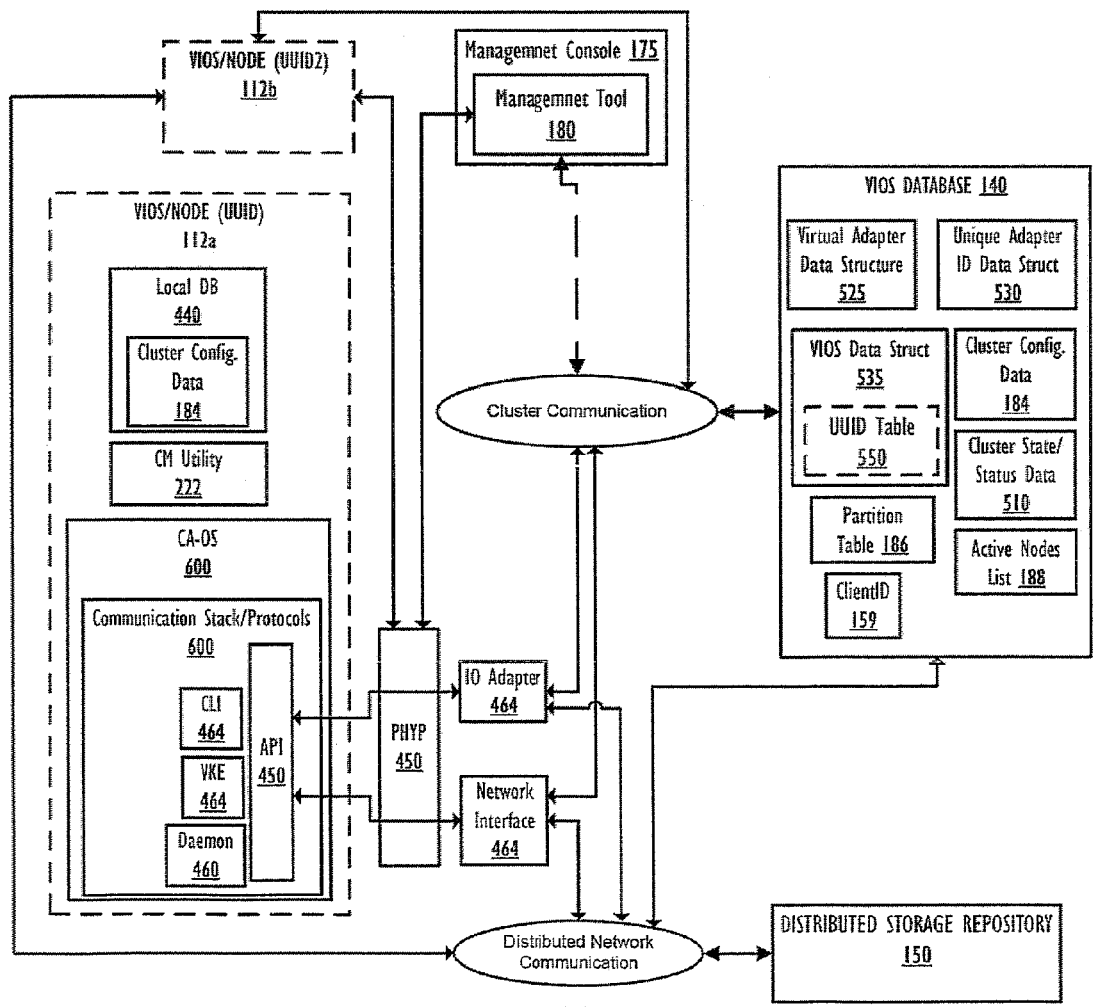
FIG. 5

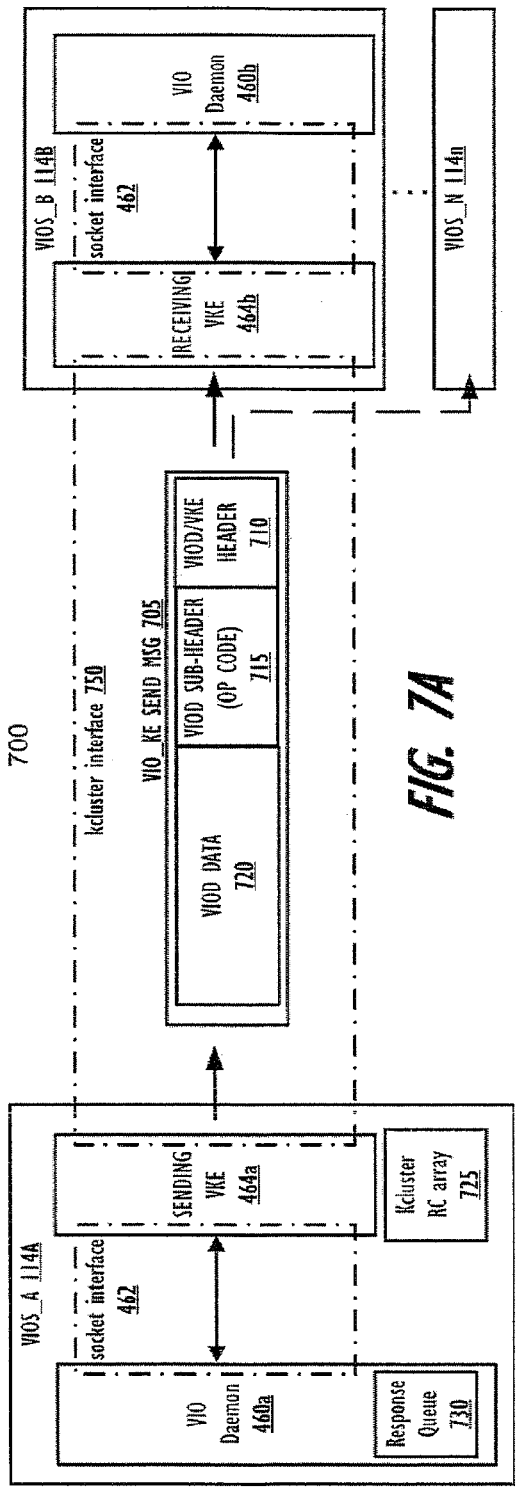

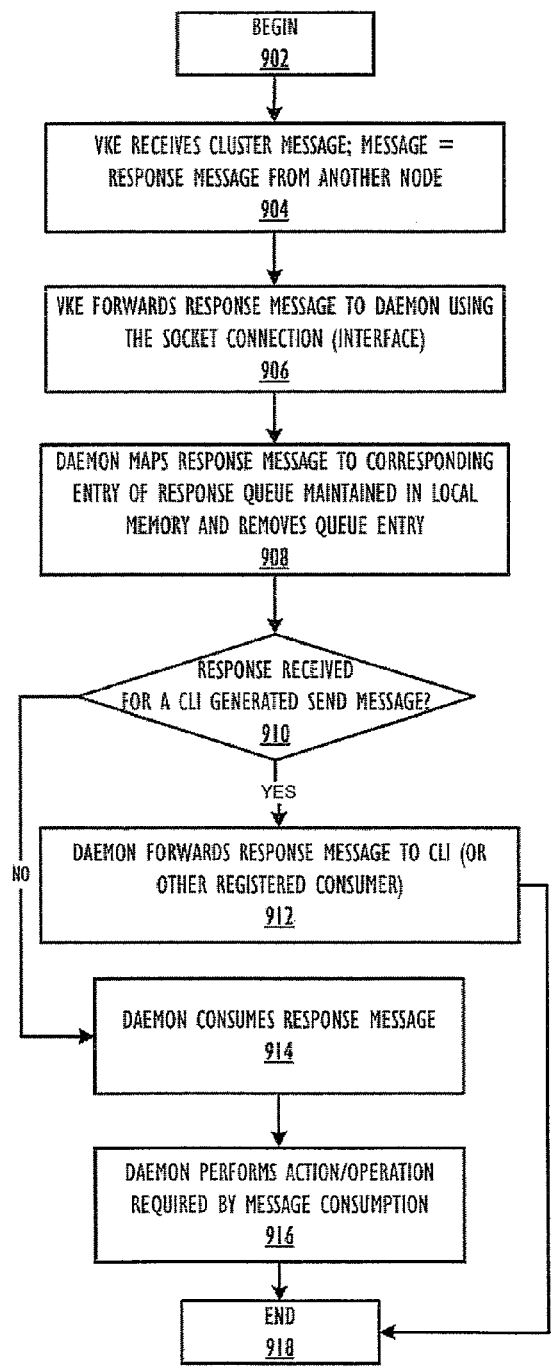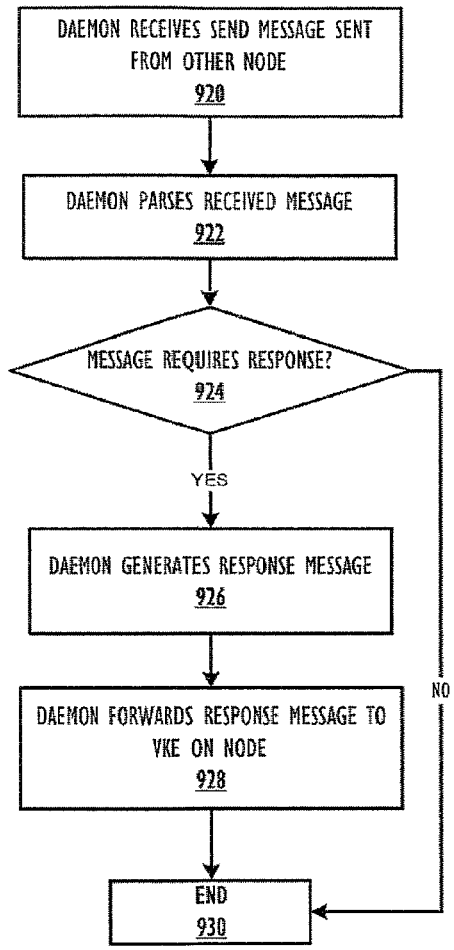

COMMUNICATION PROTOCOL FOR VIRTUAL INPUT/OUTPUT SERVER (VIOS) CLUSTER COMMUNICATION

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product that provides a communication protocol that supports message passing within a VIOS cluster.

2. Description of the Related Art

Conventional storage virtualization topology provides for a single virtual input/output server (VIOS) communicating with the applications of the client logical partitions (LPARs) assigned to that VIOS to perform I/O operations of the client LPARs. No known mechanism exists for supporting message passing within the VIOS itself or with other VIOSes.

BRIEF SUMMARY

Disclosed are a method, data processing system, and a computer program product that enable implementation of a communication protocol to support communication functionality of a cluster-aware Virtual Input/Output (I/O) Server (VIOS). In a first VIOS, the method provides: a cluster aware (CA) operating system (OS) executing on a processor resource within the first VIOS partition to perform the functions of: generating, at a sending daemon of the first VIOS, a send message that is to be transmitted to a receiving daemon at a second VIOS; in response to completion of the generating of the send message, forwarding the send message to a sending virtual small computer systems interface (vscsi) kernel extension (VKE) via a system call interface; and in response to the sending VKE receiving the send message from the sending daemon, forwarding the send message to one or more second VIOSes within the VIOS cluster utilizing a kcluster interface.

In one implementation, the generating of the send message comprises: providing a header for the send message, wherein the header includes a plurality of first fields for entry of one or more header parameters associated with the send message; providing a sub-header for the send message, wherein the sub-header includes a plurality of entries of one or more sub-header parameters associated with the send message; providing a message payload (data) for transmission; and encapsulating the header, sub-header and message payload within a send message packet.

According to one embodiment, the plurality of first fields includes a transaction identifier (ID) field and a receipt notification flag; and the plurality of entries of the sub-header comprises an opcode, a target node identifier, and one or more cluster RC fields. Further, the method comprises: parsing, at the sending VKE, at least one of a message header and a sub-header of the send message; responsive to detection of a broadcast setting for the send message, forwarding the send message to all nodes within the cluster via a cluster broadcast; and responsive to detection of a directed forwarding for the send message, forwarding the send message to those nodes identified by respective internet protocol (IP) addresses within the message header and sub-header.

In another embodiment, the method comprises: the Daemon setting a response notification field within the header or sub-header in response to the daemon wanted notification of the receipt of the send message by the one or more receiving nodes; and responsive to detection of a response notification field within the send message being set, the VKE generating a RC array to track receipt of receipt notifications from the one or more receiving nodes. In one implementation, the RC array comprises a number of entries correlated to a maximum number of the nodes within the cluster, with a different entry assigned to each node of the cluster. Also, responsive to a number of nodes within the VIOS cluster being greater than a number of entries within the RC array, the VKE autonomously retrieves the node count information from the VIOS database and updates the RC array to include a number of entries large enough to track receipt notifications for all nodes within the VIOS cluster.

The method also comprises: responsive to receipt of a receipt notification from a second node, identifying an entry corresponding to the second node within the RC array, and updating the value of the entry to indicate that a receipt notification has been received from the second node; and concurrently with forwarding the send message to the kcluster interface, setting a timer to track a time out period during which all receipt notifications received are updated within the RC array; and responsive to expiration of the time out period, forwarding the RC array to the daemon to notify the daemon of which second nodes did not receive the send message.

In one embodiment, the method further comprises: in response to the send message requiring a response message to be generated and returned to the daemon, setting within the message sub-header a request for a response message and creating a response queue with an entry corresponding to each response message that is to be received for the send message; and in response to receiving a response message from the receiving VIOS, automatically matching the response message to a send message entry held within the response queue and removing the entry from the response queue. Also, in another embodiment, the method comprises: receiving a request to generate the send message from a third party caller; in response to the send message being generated for a third party caller, updating a sub-header of the send message to indicate the third party caller as the originating source of the send message; determining whether a received response message was in response to a send message that was generated on behalf of the third party caller; and in response to the received response message being a response to the send message generated for the third party caller, automatically forwarding a response message payload to the third party caller.

In yet another embodiment, the method comprises: responsive to receiving a second send message from second Daemon, parsing the second send message to determine if a response message is required; in response to a response message being required for the received second send message, generating a response message and forwarding the response message to the VKE via a system call interface; and consuming the message payload within the received second send message.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein:

FIG. 3 illustrates an example shared storage pool utilized for storage I/O functions of the VIOSes, according to one embodiment;

FIG. 5 is a block diagram representation of stored data structures and other functional components within a VIOS cluster database (DB) and within a local VIOS DB storage, according to one or more embodiments;

FIG. 7A illustrates an example cluster communication methodology for sending a cluster message between a sending node and a receiving node utilizing the VKEs and Daemons of the respective nodes, according to one or more embodiments;

FIGS. 7B-7D respectively illustrates a VIO Daemon (VIOD) message header, subheader and a VIOD response message, according to various embodiments;

FIG. 9A is a high-level logical flowchart illustrating the method by which a VIO Daemon responds to receipt of a response message, according to one or more embodiments; and FIG. 9B is a high-level logical flowchart illustrating an example method by which a VIO Daemon responds to receipt of a sent message that requires generation of a response message, according to one or more embodiments.

DETAILED DESCRIPTION

Figure 1A:
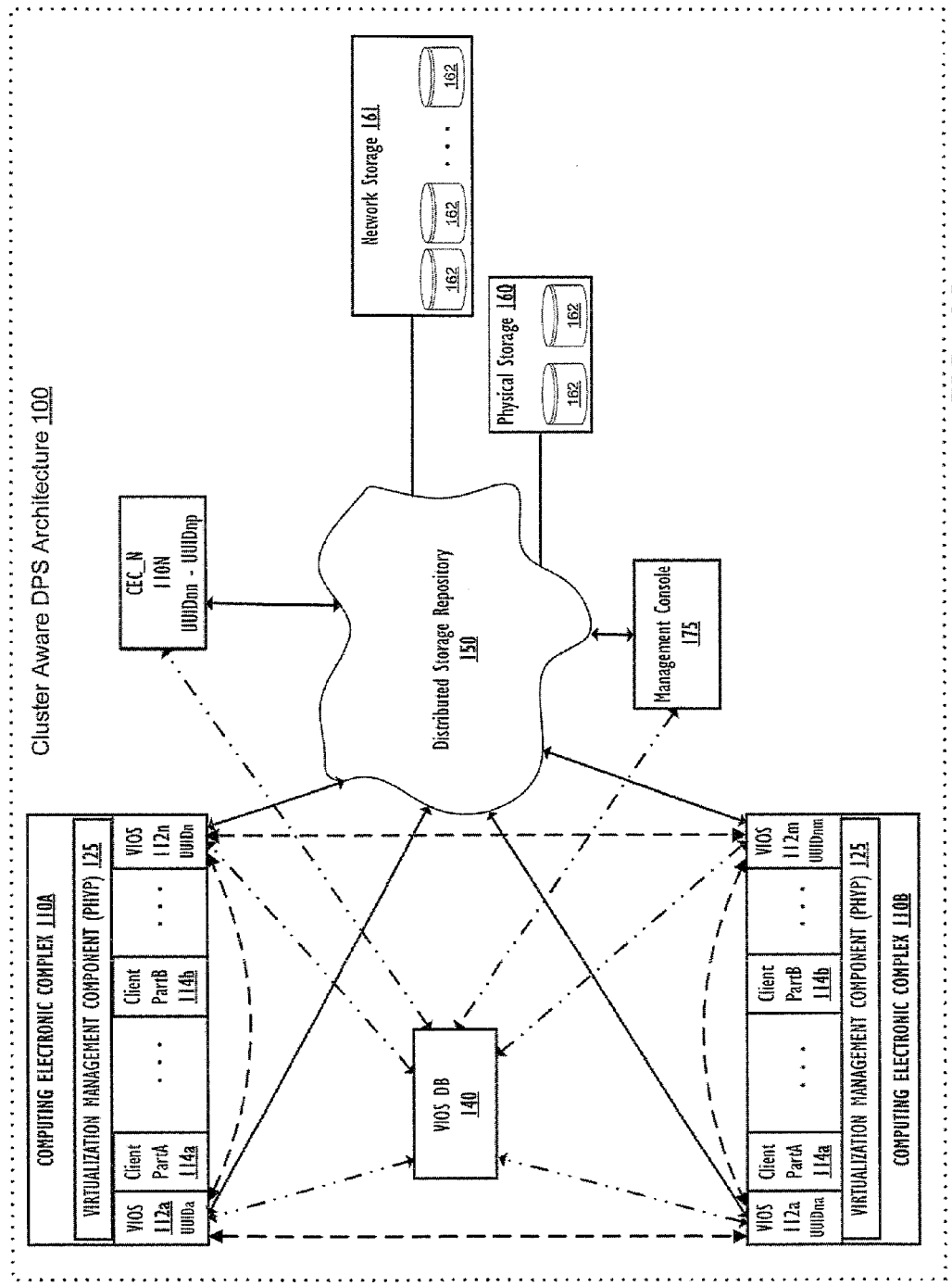
FIG. 1A illustrates a first view of a cluster (aware) data processing system within which various of the functional features of the described embodiments are implemented, according to one embodiment.

The illustrative embodiments provide a method, data processing system, and a computer program product that enable implementation of a communication protocol to support communication functionality of a cluster-aware Virtual Input/Output (I/O) Server (VIOS). In a first VIOS, the method provides: a cluster aware (CA) operating system (OS) executing on a processor resource within the first VIOS partition to perform the functions of: generating, at a sending daemon of the first VIOS, a send message that is to be transmitted to a receiving daemon at a second VIOS; in response to completion of the generating of the send message, forwarding the send message to a sending virtual small computer systems interface (vscsi) kernel extension (VKE) via a system call interface; and in response to the sending VKE receiving the send message from the sending daemon, forwarding the send message to one or more second VIOSes within the VIOS cluster utilizing a kcluster interface.

According to one embodiment, the plurality of first fields includes a transaction identifier (ID) field and a receipt notification flag; and the plurality of entries of the sub-header comprises an opcode, a target node identifier, and one or more cluster RC fields. Further, the method comprises: parsing, at the sending VKE, at least one of a message header and a sub-header of the send message; responsive to detection of a broadcast setting for the send message, forwarding the send message to all nodes within the cluster via a cluster broadcast; and responsive to detection of a directed forwarding for the send message, forwarding the send message to those nodes identified by respective internet protocol (IP) addresses within the message header and sub-header.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and sub-headings are presented within the specification:

A. General Architecture
B. Cluster-Aware VIOS
C. VIOS API Communication Infrastructure
D. VIOS Cluster Communication Protocol A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
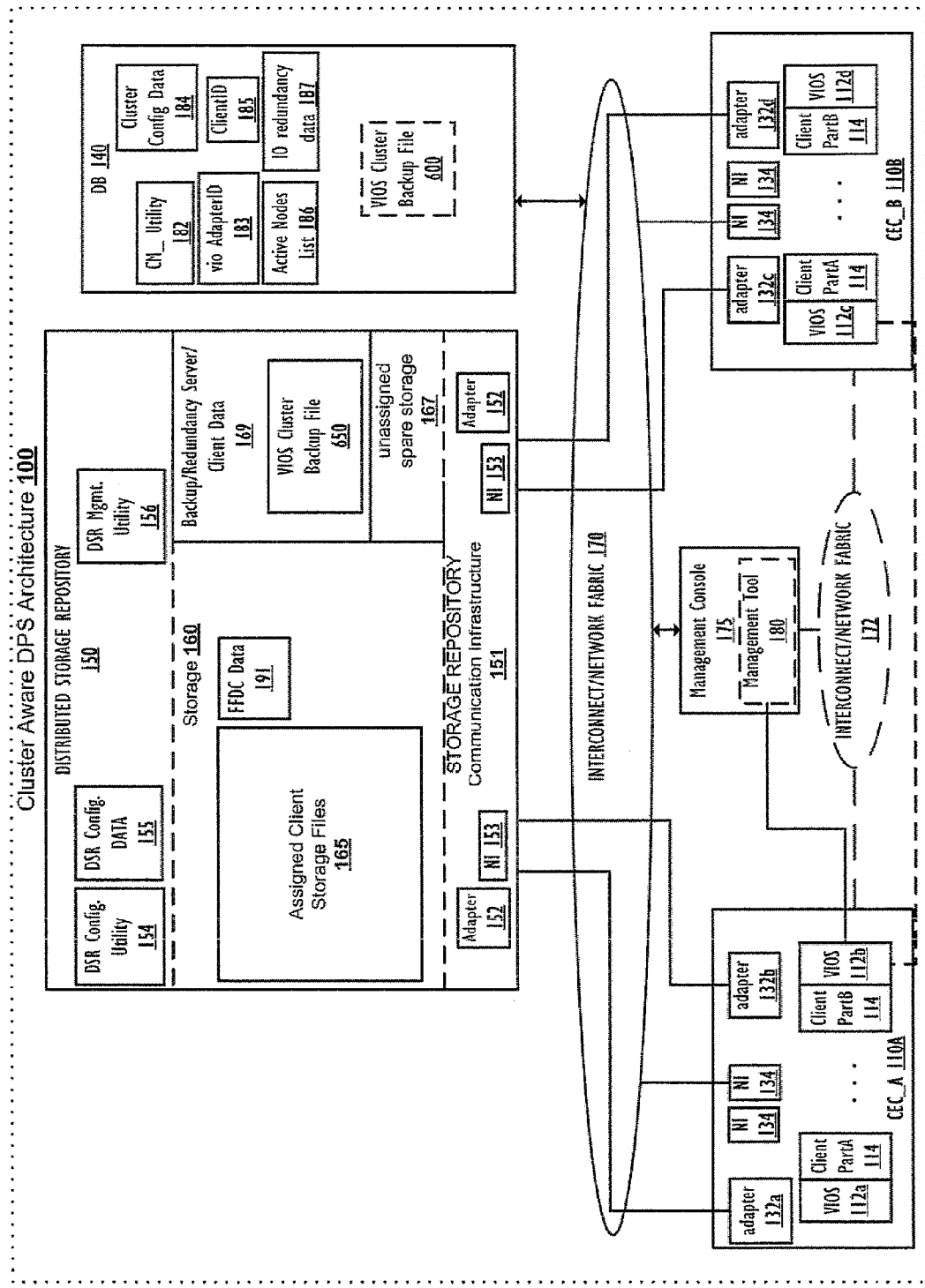
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

FIG. 3 illustrates an example configuration of a storage pool utilized within a cluster aware DPS 100. Specifically, FIG. 3 provides details on how these physical volumes are used within the storage pool. As shown, storage pool 360 within the cluster contains one or more Disk Groups 362. Disks Groups 362 provide administrators the ability to provide access policies to a given subset of physical volumes 162 within the storage pool 360. Once a disk group 362 has been defined, administrators can further categorize the subset into Storage Tiers 364 based on disk characteristics. Once a Disk Group 362 and Storage Tier 364 have been defined, administrators carve Logical Units (LU) 366 to be exported to client partitions (114).

With the capability of virtual pooling provided herein, an administrator allocates storage for a pool and deploys multiple VIOSes from that single storage pool. With this implementation, the storage area network (SAN) administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers. One such functionality is the allocation to each client LPAR of individual virtual I/O (VIO) adapters having unique adapter identifiers (AdapterID), as presented in the descriptions of the embodiments herein.

Returning to FIG. 1B, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
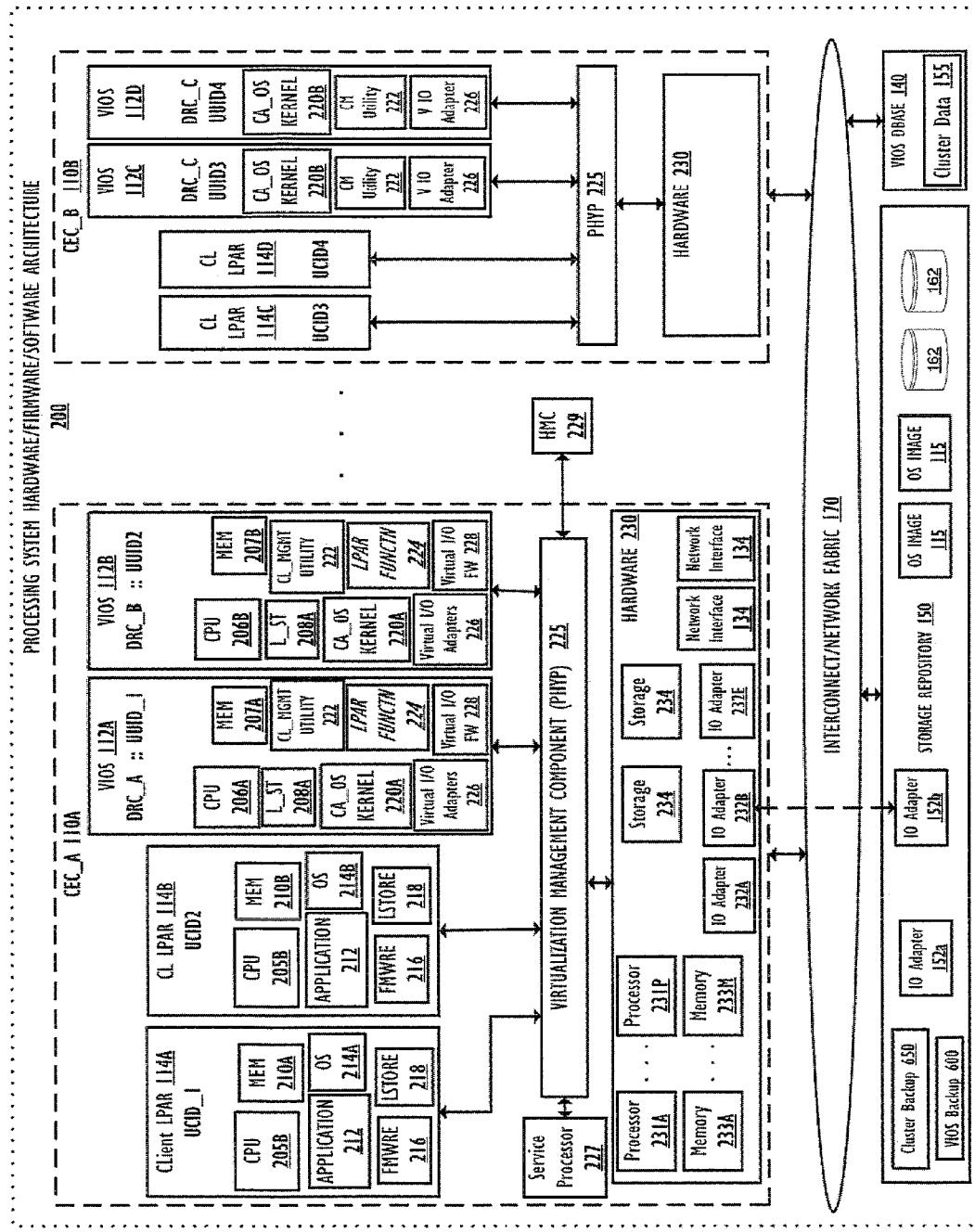
FIG. 2 illustrates an internal configuration of a computing electronic complex (CEC) within the cluster DPS having virtualized OS partitions, including virtual I/O server (VIOS) partitions with functional components that enable cluster awareness, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification. As described in greater detail below and with reference to FIGS. 4 and 7A, OS 220 comprises or provides the functionality of a communication protocol, which comprises several functional components of the VIOS, described in Section D below.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112*a* (through a communication channel established via PHYP 225), grants access to another VIOS 112*b* through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Architecture/Protocol

One embodiment provides a communication architecture/protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication architecture/protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4:
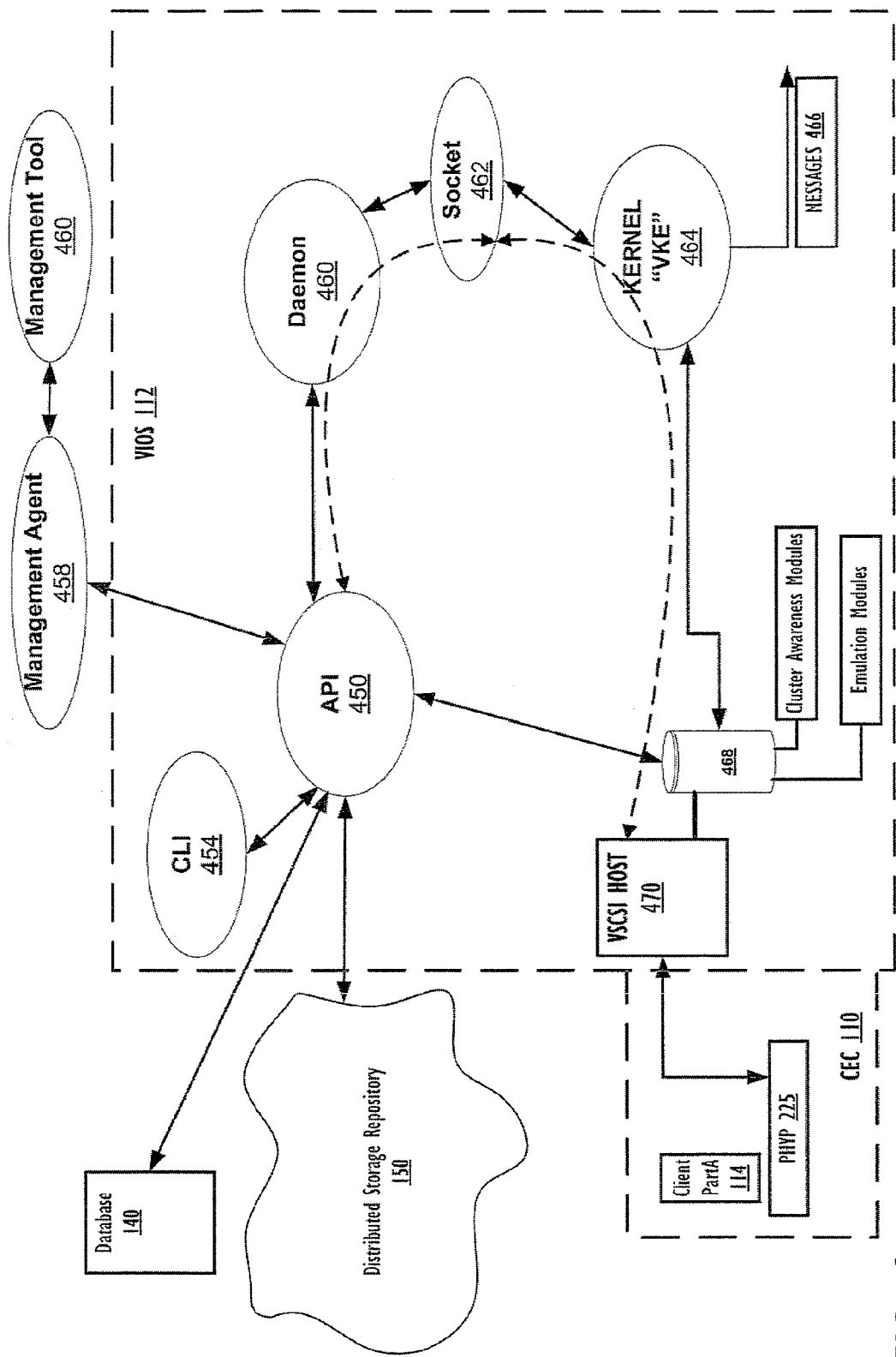
FIG. 4 is an expanded view of functional components within an example VIOS communication infrastructure including the VIOS application programming interface (API), Daemon, and vscsi kernel extension (VKE), according to one or more embodiments.

Referring now to FIG. 4, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 252 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 260 is implemented within a cluster aware server module and includes server management sub-agents 258, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a requestor a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure4 coupled to VSCSI host 470. Structure 468 includes software modules that enable the various messaging structures used for implementing VIOS cluster awareness functionality and VIOS/Client emulation. Client 114*a* logs into the VIOS 112 as part of the transport layer protocol. At the time the client 114*a* logs into the VIOS 112, the PHYP 125 provides information to the VIOS 112 regarding the identity (ID) of the client 114*a* relative to the CEC 110. The VKE 264 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed storage repository 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 310) and are associated with their corresponding clientIDs (block 312). The method illustrated by FIG. 3 ends at termination block 314, with each clientID having been associated with the corresponding one or more vio AdapterIDs with DB 140.

FIG. 5 is a block diagram representation of functional components of VIOSes and VIOS shared storage (DB 140) that provide cluster level information/data storage, management and exchange between the nodes and VIOS shared storage (DB 140). In one embodiment, a local copy of (relevant cluster level data of) VIOS DB 140 is maintained by each VIOS within the cluster and stored in respective local DB 440. Each VIOS is then responsible for storing, maintaining and updating the data structures at DB 140 in one embodiment. As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.) According to the figure, DB 140 includes a virtual adapter data structure 525, which maintains a listing of and configuration information about the virtual adapters. In one or more embodiments, VIOS DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535

When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. In one embodiment, VIOS DB 140 can also store information needed to configure a virtual target device (VTD) for a particular client.

When a VIOS 112 is first configured, the VIOS downloads from DB 140 a copy of cluster configuration data 505 and cluster state/status data 510 from VIOS DB 140. Additional data that can be retrieved from DB 140 are partition data 186, active nodes list 188, and client ID data structure 159. VIOS DB 140 may comprise a plurality of additional data structures and/or components, some of which are illustrated within VIOS DB 140, but are not germane to the description of the embodiments presented herein.

In one embodiment, DB 140 receives VIOS generated data from each VIOS across the cluster and DB 140 populates its various data structures with the received data. According to one embodiment, VIOS 112 creates a unique identifier (ID) (i.e., a ClientID) for each client that is mapped to the VIOS for I/O processing. The VIOS 112 then stores the unique ClientID in ClientID data structure 159 (FIGS. 1B and 5) within DB 140. The DB 140 and by extension the ClientID data structure 159 are accessible to each VIOS partition in the cooperating cluster (DPS 100). The VIOS 112 also generates an identifier for each virtual IT nexus (virtual I/O AdapterID) that is utilized for each virtual adapter assigned to the client LPAR 114. These vio AdapterIDs are stored in the AdapaterID data structure 158 and are associated with their corresponding clientIDs (block 312). With this use of DB 140 to maintain clientID-to-VIO Adapter mappings, each clientID can be associated with a corresponding one or more vio AdapterIDs, and every VIOS within the cluster is aware of the I/O adapter mappings across the entire cluster.

With information about each VIOS device being stored in the DB 140, operations on those devices can be performed from any VIOS node in the cluster, and not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

According to one embodiment, the VIOSes that are part of the cluster can query each other to get information regarding the storage and configuration data seen by the other VIOS. Thus, any one of the VIOSes can be queried by the management tool 180 to provide all the information for some other VIOS or for all the nodes within the cluster. The flexibility provided to the management tool further enhances the management tool's performance, as the management tool 180 can obtain all the data by querying just a single node, instead of having to query each node in the cluster, in sequence.

Figure 6:
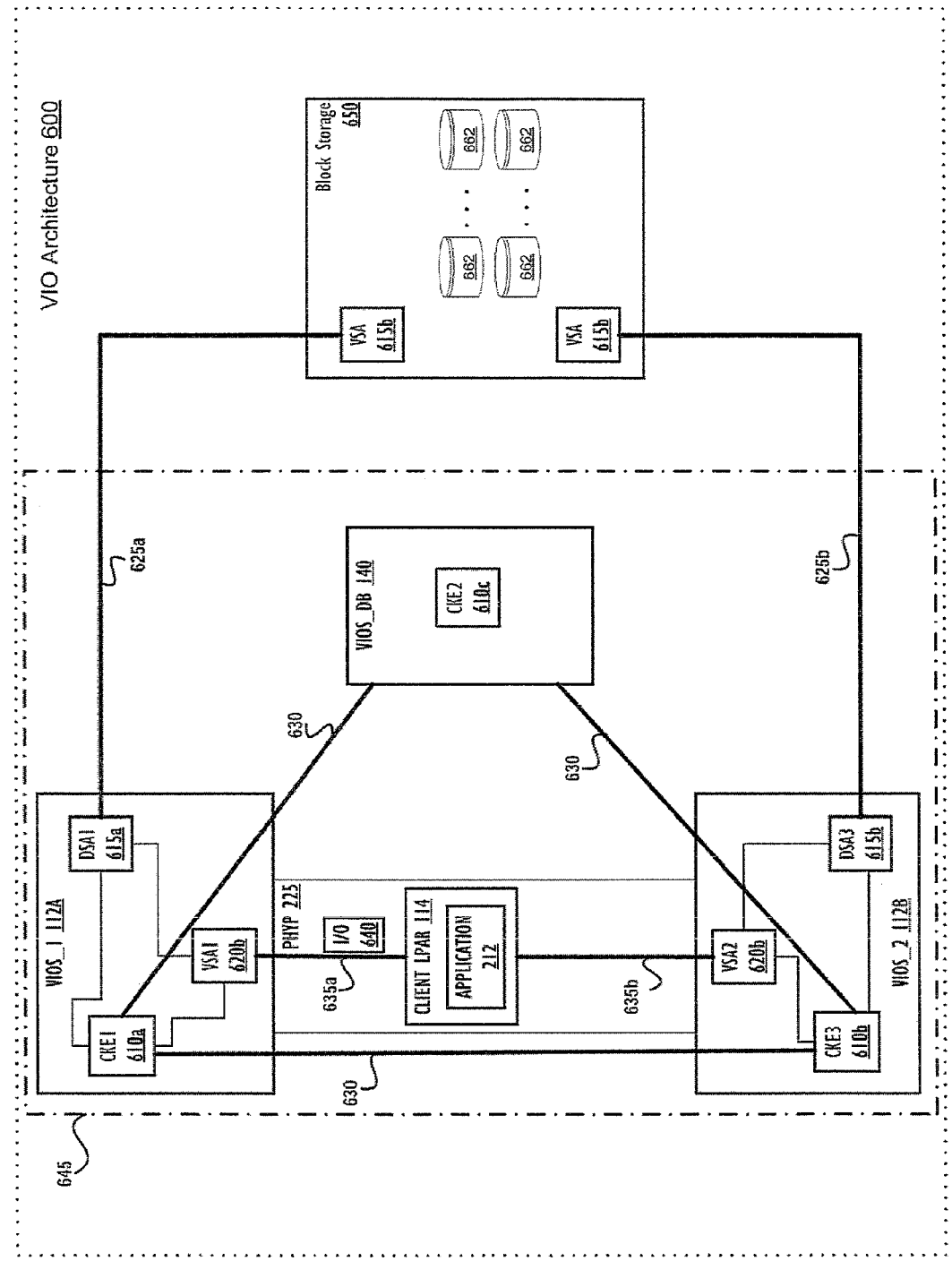
FIG. 6 is a block diagram representation of example interconnected communication structures within a VIOS cluster, according to one embodiment.

Turning now to FIG. 6, there is illustrated a block diagram representation of the interconnectivity between VIOSes within an example VIOS cluster and between the VIOSes and shared block storage 650. Specifically, FIG. 6 provides a graphical representation of the method by which a first VIOS (112A) that is assigned to provide I/O operations for a client LPAR (114) responds to a loss of connectivity with the block storage facility 650, according to one embodiment. For purposes of the present disclosure, FIG. 6 particularly presents specific software structures within a communication protocol that control/manage communication within a VIOS and between two or more VIOSes of the VIOS cluster and between a VIOS and block storage 650. As utilized within the various embodiments, block storage 650 (or block storage facility) represents any type of storage that is generally accessible from any one of multiple VIOSes within a VIOS cluster. This, block storage 650 may be the distributed storage repository 150, other network accessible storage, or local storage (e.g., storage 234 of FIG. 2). When block storage 450 is distributed storage repository 150, block storage may be a SAN or NAS, in one embodiment.

As illustrated by FIG. 6, virtual I/O (VIO) architecture 600 comprises three interconnected VIOSes, VIOS1 112A, VIOS2 112B and VIOS3 112C. Each VIOS 112 connects to block storage 650 via respective system-level storage interconnect fabric 625a, 625b, and 625c. While illustrated as a single interconnect, the connection between the VIOSes and block storage 650 is generally referred to herein as a storage interconnect fabric 625 since the actual connection may be a complex switch or network of wires. It is further appreciated that one or more communication hops within storage interconnect fabric 625 can be a wireless connection.

Each of VIOS1 112A (first VIOS), VIOS2 112B (second VIOS) and VIOS3 112C (third VIOS) is interconnected via intra-cluster interconnect fabric 630, which connects each VIOS (e.g, VIOS_A 112A) with one or more other VIOSes (e.g., VIOS 112B and 112C) within to create the VIOS cluster 645. VIOS Cluster 645 also comprises VIOS DB 140 to which each VIOS 112 within the cluster is connected (via respective cluster-level interconnect fabric, which are not specifically shown). Notably, within the described embodiments, the second and/or third VIOSes (112b/112c) can exist on the same CEC or a different CEC within the cluster from the first VIOS 112a.

Each VIOS 112A, 112B, 112C includes internal software structures within respective software stacks by which the VIOSes 112A, 112B, 112C are able to communicate with each other as well as with VIOS DB 140 and distributed storage repository 150. For example, illustrated within first VIOS 112A are the following software structures, without limitation: (1) cluster kernel extension (CKE) 610a, which is a kernel extension that allows the each VIOS (e.g., first VIOS 112A) to communicate with other VIOS nodes (e.g., second VIOS 112B) within the VIOS cluster 645; (2) distributed storage access (DSA) 615a, which is also a virtual interface that monitors the connectivity of a storage fabric from the VIOS; and (3) virtual server adapter (VSA) 620a, which is the virtualized I/O adapter that the VIOS assigns to a specific client to communicate I/O requests between the client LPAR 114 and the assigned VIOS(es).

During I/O redundancy operation, for example, VSA 620 handles the communication of the I/O request from the client and the communication of I/O response to the client. DSA 615 checks the connection status of the storage interconnect 625 of the VIOS and signals CKE when a fabric loss condition is detected on the interconnect 625. CKE 610 handles the propagation of the I/O request to another VIOS when a fabric loss condition is detected by DSA and is communicated by DSA 615 to CKE 610. The additional functionality associated with and/or manner of usage of the above set of software structures are presented in detail below.

FIG. 6 also illustrates an example client LPAR 114 on which an application 212 executes to generate example I/O operations for completion within the distributed storage repository 150. Shown beneath client LPAR 114 is virtualization management component (represented as PHYP 225). As described above, communication between client LPAR 114 and VIOS 112a occurs via PHYP 225 operating as the emulation layer facilitation exchange between the two virtual partitions. Client LPAR 114 is illustrated with connectivity 635 (enabled via software) to first VIOS 112A and third VIOS 112C. In this context, first VIOS 112A is the primary VIOS assigned to client LPAR 114 and first VIOS 112A normally handles most I/O operations originating from or directed towards client LPAR 114. Thus, while first VIOS 112A is functional and communicatively connected to distributed storage repository 150, client LPAR 114 (operating as the initiator of an I/O operation) communicates desired I/O operations 640 to/through first VIOS 112A via virtualization management component (presented as PHYP 225, in the illustrative embodiments). First VIOS 112A then completes the I/O operations on behalf of client LPAR 114 by forwarding the I/O request to block storage 150 (the target of the I/O operation) if there is no storage fabric loss condition detected on storage interconnect fabric 625a. In this scenario, the I/O requests are forwarded over storage interconnect fabric 625a. Likewise, I/O response (data or instructions, etc.) returned from distributed storage repository 150 are routed via storage interconnect fabric 625a from block storage 650 to first VIOS 112A, and first VIOS 112A then routes the I/O information received to client LPAR 114 via pHYP 225.

D. VIOS Cluster Communication Protocol

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository 150. Each VIOS includes a communication architecture that enables communication with other VIOSes and other components of the system (e.g., VIOS DB 140 and distributed storage repository 150). As presented by FIG. 4, the communication architecture of the VIOS includes a VIO Daemon 460 and a vscsi kernext (VKE) 464 which communicate via a socket interface (socket) 462. The described embodiments are supported/provided by additional functionalities of (i.e., encoded within) the CA_OS 220 and/or CM utility 222.

In order to enable the various virtual devices to communicate among each other across the VIOS cluster as well as enable each VIOS to communicate with the VIOS DB 140 a VIOS cluster communication protocol is provided. The VIOS cluster communication protocol operates as an extension of the VIOS communication architecture illustrated by FIG. 4 and described above. According to one or more embodiments, the communication protocol enables vscsi kernel extension (kernext) (referred to herein as VKE) to access the VIOS DB 140. Additionally, the cluster communication protocol provides the ability within the VIOS cluster environment for short messages to be transmitted from VKE to a VIO Daemon and for receiving short messages from the Daemon for a VKE. Two primary and two secondary functions (of a VIOS) are supported within the VIOS cluster communication protocol, including primary functions of sending messages and receiving messages, and secondary functions of sending a response and receiving a response. These functions are provided within a sending VIOS and a receiving VIOS of the VIOS cluster.

The sending and receiving functionality are described independent of each other and respectively illustrated by the flow charts of FIGS. 8 (A-B) and 9 (A-B). For clarity, the description of each function is presented along with the related flow chart and with reference to one or more of the components presented by FIGS. 1-6. FIGS. 7A-7D then provides an illustration of the transmission of a message between relevant functional structures of a sending VIOS and a receiving VIOS, as well as illustrations of the different message packages and components thereof that are utilized to perform the communication of those message packages.

Referring now to FIG. 7A, there is illustrated an example VIOS cluster communication scenario 700 in which (components of) a first VIOS 114A transmits a VIO kernext (KE) "send message" 705 to a second VIOS 114B. Specifically, as shown, VIOS Daemon 460a of VIOS_A 114A forwards a message (705) via socket interface 462 to sending VKE 464a of the same VIOS 114A. Sending VKE 464a transmits the Send Message 705 over the kcluster interface 750 to a receiving VKE 464b of the second VIOS 114B. Once the message 705 is received at the receiving VKE 464b, the receiving VKE 464b forwards the message to VIO Daemon 460b of the second VIOS 114B.

In one or more embodiments, the Send messages 705 are generated by the VIOS Daemon, while received messages are consumed by the VIOS Daemon. The types of messages generated by the Daemon can vary and include (a) messages requiring receipt notification, (b) messages not requiring receipt notification, (c) messages requiring (or triggering generation of) a response message, and (d) messages that do not require such response messages. Additionally, the Daemon can specify whether the message type is a broadcast message (to be sent to all other VIOSes within the cluster) or a directed message (to be sent to one or more specific VIOSes within the cluster identified by the VIOS(es) respective IP addresses). In other embodiments, the messages can be generated by system administrator functionality via a command line interface (CLI) to the CA_OS of the sending VIOS. Thus, according to the described embodiments, the process for sending messages at the VIOS level can be provided via a first VKE system call command/interface. The first VKE system call (or interface) can also be utilized by the VIO Daemon (VIOD) to provide response information to metadata queries of vSCSI host driver 470. (FIG. 4) In one embodiment, the same VIOD protocol header definition is utilized as with other interfaces with the VIOD. To send a message, the VIOS communication protocol defines a new opcode that indicates that the operation is a user space cluster message send operation.

VIOS Daemon 460a generates Send Message packets (705) comprising at least three components, including VIOD/VKE Header 710, VIOD Sub-header 715, and VIOD Data (payload) 720. According to one embodiment, a VKE specific header (710) precedes the VIOD data 720 in the message 705 that is sent to the kcluster services (over kcluster interface 750). A number of fields are provided within the VIOD header 710, with each field containing or capable of containing specific types of information. Various fields within an example VIOD Header 710 are provided by FIG. 7B. Included among these fields of the header 710 is a transaction identifier (ID) that uniquely identifies the transaction that generated the specific message 705 and/or which uniquely identifies the message itself. Header 710 can, in one embodiment, also comprise a status field, which contains a return code. In one embodiment, the header 710 contains information that can be used by the receiving VKE to know whether the message is a command line interface (CLI) message or an application programming interface (API) message (see FIG. 4). Header may also contain a receipt notification flag to trigger return of a receipt acknowledgement from the receiving nodes.

VIOD Sub-header 715 also comprises a plurality of fields. FIG. 7C presents a breakdown of various different fields that can be contained within the VIOD sub-header 715 of an example VIO_KE Send Message 705. The VIOS sub-header 715 presents functionality specific to a VIOS cluster and is utilized to support communication of cluster messages. The sub-header 715 contains a plurality of parameters that are not present in the header 710. In one embodiment, the following parameters (with assigned definitions) are provided for inclusion within the send cluster message sub-header 715:

opcode = VIO_KE_SNDMSG
shtype—indicates subheader type (VIO_KE_SH_MSG)
shlen—length of this sub-header
flags—0
substatus—64-bit status value return field
target_node—NULL means to broadcast
cluster_rc_ptr—pointer to where the cluster delivery rc array is to be copied
cluster_rc_len—length of the cluster delivery rc array.

Within the above parameters, target node field contains the IP address(es) of the target node(s), when the message is not intended to be a broadcast message).

Once the Daemon 460a completes generation of the Send Message 705, the Daemon forwards the message 705 to the VKE 464a via the socket interface 462. Once the message is received at the VKE, a VKE system call (e.g., 'vke_daemon_cmd( )') is utilized to send the message 705 on the kcluster interface 750. The system call takes a single parameter, and one the above inputs can be provided within the header. The VKE 464a takes the entire message "packet" including the VIOD header (i.e., send message 705) and sends the send message packet (705) on the kcluster interface 750.

According to one embodiment, a specific kcluster send message function is defined, which does not require or wait for any type of response from the receiving nodes. In embodiments where a receipt notification is required, a flag is attached to (or included within) the send message 705 to provide the capability of receipt notification. In one embodiment, and as illustrated by FIG. 7B, the receipt notification flag 725 is provided within the VIOD/VKE header 710. When requesting receipt notification, an array of kcluster receipt structures 725 is provided by the caller to hold the receipt result information. In one or more embodiments, the array of receipt structures 725 only provides the status of the delivery of the message and does not provide any status from the remote daemon.

In one embodiment, when the caller (e.g., the Daemon or registered application, such as the management tool) requests receipt notification, the VKE generates an array of kcluster receipt structures (RC array) 725. In one embodiment, the VKE 464a maintains and updates the array for a pre-set period of time during which the receipt notification is expected to be received from each live node (receiving the sent message) within the cluster. The RC array 725 includes an entry for each node/VIOS registered within the cluster, such that receipt notification from the entire number of registered nodes can be accounted for by the RC array 725. When the receiving nodes receive a message that includes an indication that a receipt notification is required for the message, the nodes each generate and issue a receipt notification that is sent back to the sending VKE 464a. The VKE 464a is then able to update the RC array 725 to indicate which nodes have sent a receipt notification for the message. At the end of the notification response period, the RC array updated with the recorded receipt notifications is sent to the Daemon for processing. The Daemon can elect to re-issue messages to those nodes that have not indicated that they received the sent message, in one embodiment.

The CA_OS communication protocol provides the functionality for sending a response to a received message. However, generating and sending the response message 707 is similar to sending another send message with a different opcode. The response message 707 uses the same fields/parameters as the send message, in one embodiment; However, according to one or more embodiments, some of the inputs can be utilized differently. Among the inputs provided within the sub-header of an example response message 707 are the following (presented along with their respective definitions/descriptions).

opcode = VIO_KE_SNDRSP
shtype—indicates sub-header type (VIO_SH_TYPE_CLMSG)
shlen—length of this sub-header
flags—0
substatus—64-bit status value
target_node—set to identify the sender of the original msg (e.g. unicast).
flags—none
cluster_rc_ptr—received pointer - probably would be null
cluster_rc_len—received length - probably would be zero An example VIO Response Message 707 is illustrated by FIG. 7D. As shown, response message 707 includes VIOD/VKE header 710 (which can contain similar entries to that of the send message 705, with one or more exceptions) and VIOD Sub-header 717 (which can be different from sub-header 715 of send message 705 in one or more values contained within the fields or the opcode). According to one embodiment, the Daemon 460b of the receiving node (second VIOS 114B) generates and sends a response message 707, via a message generation process that can be similar to the procedure for sending a message. However, the response message 707 does not itself trigger any return of a confirmation/response message (i.e., does not require a receipt notification). According to one embodiment, when the Daemon 460b of the receiving node (114B) sends the response message 707, the Daemon 460b generates a new VIOD protocol "packet" is and includes within the packet specific opcode, which indicates that the message is a response message (to differentiate from a send message).

On receipt by the VKE 464a of a message with the specific "response-type" opcode attached/included therein, the VKE (464a) will automatically utilize the opcode to correlate the response (707) to a held request from a previously issued message (e.g., message 705). Specifically, the VKE 464a forwards the received response message to the Daemon 460a, and the Daemon 460a matches the response to an appropriate entry within the message/response queue 730 being maintained by the Daemon 460a to track sent messages for which responses are still due/outstanding. Once the corresponding entry of the response queue 730 is identified, the Daemon 460 removes the entry from the response queue 730 and performs any follow up operation required on receipt of the particular response message.

Turning now to the flow charts of FIGS. 8A, 8B and 9A, 9B, wherein are illustrated embodiments of various methods by which the above introduced processes of VIOS cluster send and receive communication are enabled and/or completed. Although the methods illustrated by FIGS. 8 and 9 may be described with reference to components and functionality illustrated by and described in reference to FIGS. 1-7, it should be understood that this is merely for convenience and alternative components and/or configurations thereof can be employed when implementing the various methods. Certain portions of the methods may be completed by functional components/modules of CA_OS 220 executing on one or more (virtual) processors (CPU 206A) within VIOS 112 (FIG. 1 or 2). The executed processes then control specific communication features of, on, or between the VIOSes 112 and DB 140 (and distributed storage repository 150, in some embodiments) of the VIOS cluster.

Figure 8A:
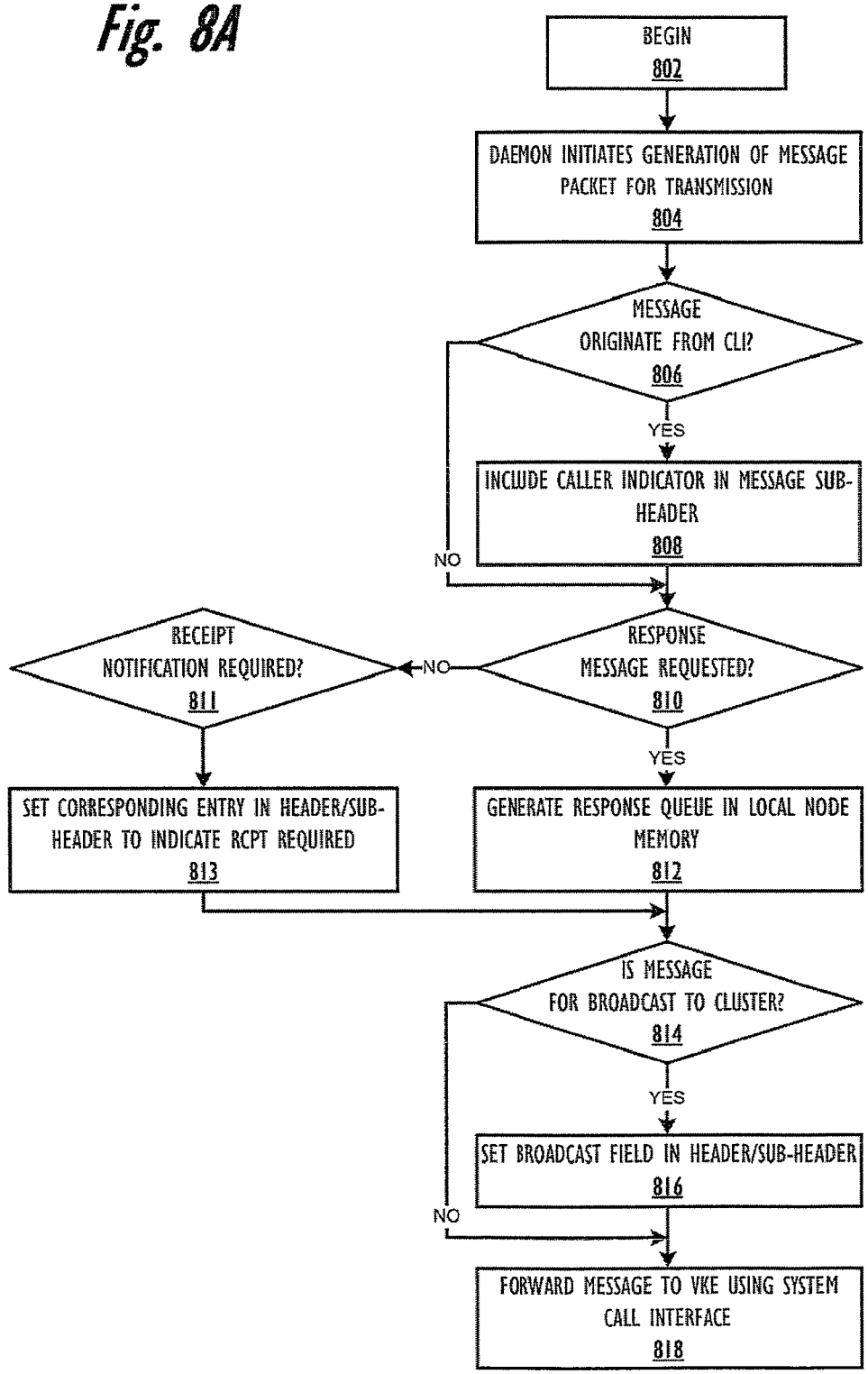
FIG. 8A is a high-level logical flowchart illustrating an example method by which a VIO Daemon generates and forwards a VIOD message for transmitting over a kcluster interface, according to one or more embodiments.

Referring specifically now to FIG. 8A, there is illustrated a flow chart depicting a method by which the Daemon 460a of the first VIOS performs the generation and subsequent sending/transmitting of a short message to the VKE 464a. The process involves specific code of the CA_OS, which provide the Daemon functionality, generating a send massage packet comprising the above defined components and associated fields/parameters of the header and sub-header and a message payload. The method begins at initiation block 802 and proceeds to block 804 at which the Daemon 460a initiates generation of a message packet for transmission. During generation of the message packet and specifically during generation of the header and sub-header of the message packet, a series of determinations are completed by the Daemon to determine which parameter values should be inserted (or included) within certain fields of the header and/or sub-header. At decision block 806, Daemon determines if the message originated from a CLI entry or other registered caller (i.e., not a Daemon originated message). When the message is not one originating from the Daemon, the Daemon includes within the sub-header an entry which indicates which component is the originator of the message (block 808). At decision block 810, Daemon determines whether a response message is required for the send message packet being generated s received by the VKE 464a. When a response message is required, Daemon sets the corresponding entry of the message header and generates a response queue (or a response queue entry) for the send message to track when the response is later received for the send message (block 812). At decision block 811, Daemon determines whether a receipt notification is required for the send message, and when the receipt notification is required, Daemon sets the corresponding entry of the message header/sub-header (block 813). At decision block 814, Daemon determines if the message is to be broadcast. In response to the message being a broadcast message, Daemon sets the appropriate filed in the header/sub-header to trigger the broadcast of the send message (block 816). Once Daemon completes the generation of the send message, Daemon forwards the send message to the VKE 464a using a system call interface.

Figure 8B:
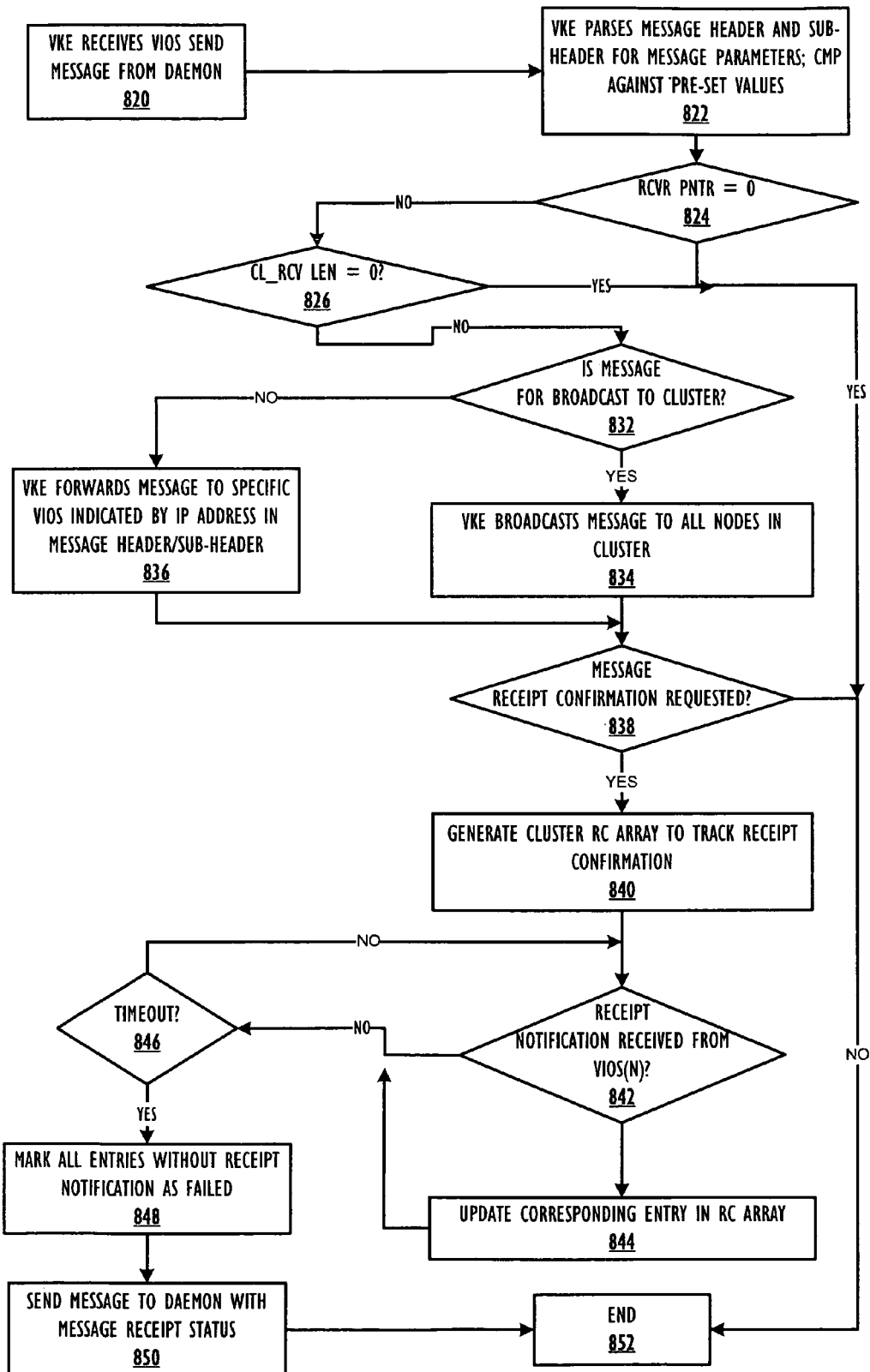
FIG. 8B is a high-level logical flowchart illustrating an example method by which a VKE receives and processes a VIOD message for transmitting over a kcluster interface, according to one or more embodiments.

The method by which the send message is transmitted from the VIOS is illustrated by FIG. 8B. The method begins at block 820 at which the VKE (464a) receives the VIOS send message packet 705 from the Daemon 460 via the socket interface 462. The VKE 464a parses the send cluster message header 710 and/or sub-header 715 of the received send message packet for the associated parameter(s) include within specific fields therein (block 822). The respective values of specific parameters are retrieved for checking/comparing against pre-established values. The VKE checks at block 824 whether the cluster_rc_ptr ("received pointer") parameter has a NULL value. The VKE also checks at block 826 whether the cluster_rc_len ("received length") is zero (0). If either of these checks yields a positive (Yes) result, the VKE is alerted not to wait for, and the VKE will therefore not wait for, delivery confirmation return codes. However, if the pointer is not NULL and the length is greater than zero, the VKE utilizes the kcluster interface to provide delivery confirmation status.

The VKE determines (block 832) whether the message is for broadcast to the cluster (by checking the appropriate entry within the header/sub-header). In response to the message being a broadcast message, the VKE broadcasts the message to all nodes within the cluster (block 834). However, in response to the message not being a broadcast message, the VKE forwards the message to the specific VIOS(es) indicated by the respective IP addresses entered within message header/sub-header (block 836). At decision block 838, VKE determines (again by reading the specific entry within the send message header/sub-header) whether message receipt confirmation is required for the send message. In response to the receipt confirmation being required, the VKE generates a cluster RC array to track the message receipt confirmation (block 840). At decision block 842, VKE receives a message from the cluster and checks whether the received message is a receipt notification from a node within the cluster. In response to receipt of a receipt notification message, VKE updates the entry within the RC array corresponding to the specific node from which the receipt notification was received (block 844). VKE monitors for receipt of these receipt notification messages for a pre-established timeout period, and checks at block 846 when the timeout period expires. During normal messaging operations, where all N+1 nodes are alive, a total of N entries (representing all nodes of the cluster except the sending node) within the RC array are expected to be updated within the timeout period. That is, the VKE should expect to receive a receipt notification message from all of the other N nodes in the cluster in response to issuing a broadcast message from the sending node. As a node's receipt notification is received, that node's entry within the RC array is updated to indicate the receipt of the notification. The remaining nodes, whose entries are not updated are assumed to have not received the send message or be experiencing a problem receiving or sending messages within the cluster. In one embodiment, described by FIG. 9B, the Daemon re-tries resending the send message to those VIOSes that do not return a receipt notification to the VKE.

Returning to the flow chart, at the expiration of the time-out period, the VKE marks all entries of the RC array corresponding to nodes from which no receipt notification has been received as failed (block 844). The VKE then sends the notification data, based on the RC array entries, to the Daemon to inform the Daemon of the delivery status of the send message with respect to the target nodes (block 850). The process then ends at block 852.

One embodiment enables the VKE to trigger an autonomous update of the value of N (maximum number of nodes in the cluster) based on received change information about the maximum number of nodes supported within the cluster. When a receipt notification is required for the send message, the VKE checks (via a query on the kcluster interface to the VIOS DB 140) that there is enough space in the RC array 725 to hold the results for each node in the cluster (block 824). If there is not enough space within the RC array, indicating that the cluster has gotten larger since the previous setting of the maximum cluster size, the kcluster send operation is halted/suspended and the CA_OS autonomically changes the length parameter of the RC array to indicate the amount of space/entries needed to account for the maximum number of VIOSes within the cluster. The information about the amount of space needed is passed back to the caller by the VKE. Specifically, according to one embodiment, passing of the change of the length parameter back to the VKE involves the following processes: (a) the return code from the kcluster send message is placed in the status field of the send message header. Upon completion of the send message operation, the VKE copies the VIOD header 705 and the sub-header 710 back out to user space. In one embodiment, the copy back overwrites the headers that are passed in on the system call. The copy back method updates fields in the header, which facilitates returning the kcluster size needed information.

FIG. 9A illustrates the method by which the VKE and Daemon respond to receipt of a response message. The method begins at block 902 and proceeds to block 904 at which the VKE 464a receives a cluster message 705/707, which the VKE determines is a response message (based on characteristics of the opcode). The VKE determines that the message is a daemon based message, and the VKE 464 sends the entire message packet (the VIOD Header 710, sub-header 715 and VIOD data 720) to the Daemon 460a via the socket interface 462 (block 906). On receipt of the response message, the Daemon maps/correlates the response message to a corresponding entry within the response queue being maintained by the Daemon, and removes the entry from the response queue (block 908). At decision block 910 the Daemon determines whether the initial message was for a third party caller (e.g., a CLI generated send message). When the message originated from a third party caller, the Daemon forwards the response message to the particular third party caller for consumption by the third party caller (block 912). Otherwise, the Daemon consumes the response message as a response to a send message that was originated by the Daemon (block 914). The Daemon also performs any operations/actions required by the consumption of the response message (block 916). The process ends at block 918.

FIG. 9B illustrates the method by which a response message is sent following receipt of a send message by a second/receiving Daemon 460b (via VKE 464b) from a first/sending Daemon 460a (via VKE 464b), according to one embodiment. The method begins at block 920 at which second Daemon 460b receives a send message which was sent by a first Daemon 460a located at a next node within the cluster. The receiving Daemon parses the message header for certain parameter values (block 922), and Daemon determines at decision block 924 whether the message requires a response. In response to the received send message requiring a response, the receiving Daemon generates an appropriate response message (block 926).

According to one embodiment, when the receiving node is triggered to send a response message, the receiving Daemon generates a new VIOD protocol "packet", and includes within the response packet a specific opcode to indicate that the message is a response message (to differentiate from a send message). To match the response to its corresponding original message, certain identifying fields of the VIOD header are made the same as the original request so that the response can be properly correlated with the original message on the destination node. In one embodiment, response messages can be sent as 'unicast' messages, targeting only the node that sent the original message. On receipt of a message with the specific opcode attached/included therein, the VKE will automatically utilize the opcode to correlate the response to a held request from a previously issued message. The response message is then passed/transmitted by the VKE 464b with the appropriate opcode for sending a response message included within the header/sub-header.

Returning to FIG. 9B, following generation of the response message, the receiving Daemon then forwards the response message to the VKE 464b for transmission of the response message to the first node across the kcluster interface 750. It is appreciated that generation of a response message may first require the second Daemon consume the payload data of the received message. The timing of the data consumption by the receiving Daemon is, however, not dispositive of the other steps presented in the method.

Notably, following initial receipt of the message and prior to forwarding the received message to the second Daemon 460b, the receiving VKE 464b parses the received message and checks if a receipt notification is required. The VKE 464b then generates and issues the appropriate receipt notification when such a notification is requested by the send message.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having one or more computing electronic complexes (CECs) that each comprise a plurality of virtual input/output (I/O) servers (VIOSes) configured within a VIOS cluster which has an associated VIOS database (DB), and in which each of the plurality of VIOSes provides I/O resources to one or more logical partitions (LPARs) executing within the one or more CECs, a first VIOS of the VIOS cluster performing a method comprising:

generating, at a sending daemon of the first VIOS, a send message that is to be transmitted to a receiving daemon at a second VIOS, wherein the generating of the send message comprises:
  providing a header for the send message, wherein the header includes a plurality of first fields for entry of one or more header parameters associated with the send message;
  providing a sub-header for the send message, wherein the sub-header includes a plurality of entries of one or more sub-header parameters associated with the send message;
  providing a message payload for transmission; and
  encapsulating the header, sub-header, and the message payload within a send message packet;
in response to generating the send message, forwarding the send message to a sending virtual small computer systems interface (VSCSI) kernel extension (VKE) via a system call interface, wherein the VKE emulates a small computer systems interface (SCSI) device in the first VIOS;
in response to the sending VKE receiving the send message from the sending daemon, forwarding the send message to one or more receiving VKEs of a respective one or more VIOSes within the VIOS cluster utilizing a VKE system call that sends the send message over a kcluster interface that interconnects the sending VKE and the one or more receiving VKEs, wherein the one or more receiving VKEs emulate a SCSI device in the respective one or more VIOSes;
in response to the send message requiring a response message be generated and returned to the sending daemon:
  setting a request for a response message within the sub-header; and
  creating a response queue having an entry corresponding to each response message that is to be received for the send message; and
in response to receiving a response message from a receiving VIOS, automatically matching the response message to a particular send message entry within the response queue and removing the particular send message entry from the response queue.

2. The method of claim 1, wherein:
the plurality of first fields includes a transaction identifier (ID) field and a receipt notification flag; and
the plurality of entries of the sub-header comprises an opcode, a target node identifier, and one or more cluster RC fields.

3. The method of claim 2, further comprising:
parsing, at the sending VKE, at least one of the header and the subheader of the send message;
in response to detecting a broadcast setting for the send message, forwarding the send message to all VIOSes within the VIOS cluster via a cluster broadcast; and
in response to detecting a directed forwarding for the send message, forwarding the send message to those VIOSes of the plurality of VIOSes that are identified by one or more respective internet protocol (IP) addresses within the header and the sub-header.

4. The method of claim 2, further comprising:
in response to the plurality of first fields including a receipt notification flag, the sending daemon setting a response notification field within the header or the sub-header;
in response to detecting a response notification field within the send message being set, the VKE generating a RC array to track receipt of one or more receipt notifications from one or more receiving VIOSes; and in response to determining a number of VIOSes within the VIOS cluster being greater than a number of entries within the RC array, autonomously retrieving node count information from the VIOS database and updating the RC array to include a number of entries large enough to track receipt notifications for all VIOSes within the VIOS cluster.

5. The method of claim 4, wherein the RC array comprises a number of entries correlated to a maximum number of the VIOSes within the VIOS cluster, with a different entry assigned to each VIOS of the cluster, and wherein the method further comprises:
in response to receiving a receipt notification from a second VIOS, identifying an entry corresponding to the second VIOS within the RC array, and updating the value of the entry to indicate that a receipt notification has been received from the second VIOS;
concurrently with forwarding the send message to the kcluster interface, setting a timer to track a time out period during which all receipt notifications received are updated within the RC array; and
in response to the time out period expiring, forwarding the RC array to the sending daemon to notify the sending daemon of which VIOSes of the one or more VIOSes within the VIOS cluster that did not receive the send message.

6. The method of claim 1, further comprising:
receiving a request to generate the send message from a third party caller;
in response to generating the send message for the third party caller, updating the sub-header of the send message to indicate the third party caller as the originating source of the send message;
determining whether a response message was received in response to the send message generated for the third party caller; and
in response to receiving the response message to the send message generated for the third party caller, automatically forwarding a response message payload to the third party caller.

7. The method of claim 1, further comprising:
in response to receiving a second send message from a second daemon, parsing the second send message to determine whether a response message is required in response to the second send message;
in response to determining the response message is required in response to the second send message, generating the response message and forwarding the response message to the VKE via the system call interface; and
consuming a message payload within the second send message.

8. A data processing system comprising:
one or more processors;
one or more memories coupled to the one or more processors;
at least one input/output (I/O) adapter that enables connection to an external network with a shared storage repository and a shared database; and
a virtualization management component executing within the data processing system to generate a plurality of operating system (OS) partitions including a first virtual I/O server (VIOS) partition comprised of a Daemon and a VKE communicatively connected to each other via a socket interface, wherein a first VIOS performs the functions of:
generating, at a sending daemon of the first VIOS, a send message that is to be transmitted to a receiving daemon at a second VIOS, wherein the generating of the send message comprises:
providing a header for the send message, wherein the header includes a plurality of first fields for entry of one or more header parameters associated with the send message;
providing a sub-header for the send message, wherein the sub-header includes a plurality of entries of one or more sub-header parameters associated with the send message;
providing a message payload for transmission; and
encapsulating the header, sub-header, and the message payload within a send message packet;
in response to generating of the send message, forwarding the send message to a sending virtual small computer systems interface (VSCSI) kernel extension (VKE) via a system call interface, wherein the VKE emulates a small computer systems interface (SCSI) device in the first VIOS;
in response to the sending VKE receiving the send message from the sending daemon, forwarding the send message to one or more receiving VKEs of a respective one or more VIOSes within the VIOS cluster utilizing a VKE system call that sends the send message over a kcluster interface that interconnects the sending VKE and the one or more receiving VKEs, wherein the one or more receiving VKEs emulate a SCSI device in the respective one or more VIOSes;
in response to the send message requiring a response message be generated and returned to the sending daemon:
setting a request for a response message within the sub-header; and
creating a response queue having an entry corresponding to each response message that is to be received for the send message; and
in response to receiving a response message, automatically matching the response message to a particular send message entry within the response queue and removing the particular send message entry from the response queue.

9. The data processing system of claim 8, wherein:
the plurality of first fields includes a transaction identifier (ID) field and a receipt notification flag;
the plurality of entries of the sub-header comprises an opcode, a target node identifier, and one or more cluster RC fields; and
the first VIOS further performs the following functions:
parsing, at the sending VKE, at least one of the header and the subheader of the send message;
in response to detecting a broadcast setting for the send message, forwarding the send message to all VIOSes within the VIOS cluster via a cluster broadcast; and
in response to detecting a directed forwarding for the send message, forwarding the send message to those VIOSes of the plurality of VIOSes that are identified by one or more respective internet protocol (IP) addresses within the header and the sub-header.

10. The data processing system of claim 9, wherein the first VIOS further performs the functions of:
in response to the plurality of first fields including a receipt notification flag, the sending daemon setting a response notification field within the header or the sub-header;
in response to detecting a response notification field within the send message being set, the VKE generating a RC array to track receipt of one or more receipt notifications from one or more receiving VIOSes; and in response to determining a number of VIOSes within the VIOS cluster being greater than a number of entries within the RC array, autonomously retrieving node count information from the VIOS database and updating the RC array to include a number of entries large enough to track receipt notifications for all VIOSes within the VIOS cluster.

11. The data processing system of claim 10, wherein the RC array comprises a number of entries correlated to a maximum number of the VIOSes within the VIOS cluster, with a different entry assigned to each VIOS of the cluster, and wherein the first VIOS further performs the functions of:

in response to receiving a receipt notification from a second VIOS, identifying an entry corresponding to the second VIOS within the RC array, and updating the value of the entry to indicate that a receipt notification has been received from the second VIOS;

concurrently with forwarding the send message to the kcluster interface, setting a timer to track a time out period during which all receipt notifications received are updated within the RC array; and in response to the time out period expiring, forwarding the RC array to the sending daemon to notify the sending daemon of which VIOSes of the one or more VIOSes within the VIOS cluster that did not receive the send message.

12. The data processing system of claim 8, wherein the first VIOS further performs the functions of:

receiving a request to generate the send message from a third party caller;

in response to generating the send message for the third party caller, updating the sub-header of the send message to indicate the third party caller as the originating source of the send message;

determining whether a response message was received in response to the send message generated for the third party caller; and in response to receiving the response message to the send message generated for the third party caller, automatically forwarding a response message payload to the third party caller.

13. The data processing system of claim 8, wherein the first VIOS further performs the functions of:

in response to receiving a second send message from a second daemon, parsing the second send message to determine whether a response message is required in response to the second send message;

in response to determining the response message is required in response to the second send message, generating the response message and forwarding the response message to the VKE via the system call interface; and consuming a message payload within the second send message.

14. A computer program product comprising:

a non-transitory computer readable storage medium; and program code on the non-transitory computer readable storage medium that when executed within a data processing system having virtual operating system (OS) partitions provides a communication protocol for a first virtual input/output server (VIOS) that is communicatively connected to at least a second VIOS within a VIOS cluster and which is configured with a Daemon and a VKE communicatively connected to each other via a socket interface, wherein the communication protocol enables the first VIOS to perform the following functions:

generating, at a sending daemon of the first VIOS, a send message that is to be transmitted to a receiving daemon at a second VIOS, wherein the generating of the send message comprises:

providing a header for the send message, wherein the header includes a plurality of first fields for entry of one or more header parameters associated with the send message;

providing a sub-header for the send message, wherein the sub-header includes a plurality of entries of one or more sub-header parameters associated with the send message;

providing a message payload for transmission; and encapsulating the header, sub-header, and the message payload within a send message packet;

in response to generating the send message, forwarding the send message to a sending virtual small computer systems interface (VSCSI) kernel extension (VKE) via a system call interface, wherein the VKE emulates a small computer systems interface (SCSI) device in the first VIOS;

in response to the sending VKE receiving the send message from the sending daemon, forwarding the send message to one or more receiving VKEs of a respective one or more VIOSes within the VIOS cluster utilizing a VKE system call that sends the send message over a kcluster interface that interconnects the sending VKE and the one or more receiving VKEs, wherein the one or more receiving VKEs emulate a SCSI device in the respective one or more VIOSes;

in response to the send message requiring a response message be generated and returned to the sending daemon:

setting a request for a response message within the sub-header; and creating a response queue having an entry corresponding to each response message that is to be received for the send message; and in response to receiving a response message, automatically matching the response message to a particular send message entry within the response queue and removing the particular send message entry from the response queue.

15. The computer program product of claim 14, wherein:

the plurality of first fields includes a transaction identifier (ID) field and a receipt notification flag;

the plurality of entries of the sub-header comprises an opcode, a target node identifier, and one or more cluster RC fields; and the program code comprise code that causes the first VIOS to perform the following functions:

parsing, at the sending VKE, at least one of the header and the subheader of the send message;

in response to detecting a broadcast setting for the send message, forwarding the send message to all VIOSes within the VIOS cluster via a cluster broadcast;

in response to detecting a directed forwarding for the send message, forwarding the send message to those VIOSes of the plurality of VIOSes that are identified by one or more respective internet protocol (IP) addresses within the header and the sub-header;

in response to the plurality of first fields including a receipt notification flag, the sending daemon setting a response notification field within the header or the sub-header;

in response to detecting a response notification field within the send message being set, the VKE generating a RC array to track receipt of one or more receipt notifications from one or more receiving VIOSes; and in response to determining a number of VIOSes within the VIOS cluster being greater than a number of entries within the RC array, autonomously retrieving node count information from the VIOS database and updating the RC array to include a number of entries large enough to track receipt notifications for all VIOSes within the VIOS cluster.

16. The computer program product of claim 15, wherein the RC array comprises a number of entries correlated to a maximum number of the VIOSes within the VIOS cluster, with a different entry assigned to each VIOS of the cluster, and wherein the program code further causes the first VIOS to perform the functions of:

in response to receiving a receipt notification from a second VIOS, identifying an entry corresponding to the second VIOS within the RC array, and updating the value of the entry to indicate that a receipt notification has been received from the second VIOS;

concurrently with forwarding the send message to the kcluster interface, setting a timer to track a time out period during which all receipt notifications received are updated within the RC array; and in response to the time out period expiring, forwarding the RC array to the sending daemon to notify the sending daemon of which VIOSes of the one or more VIOSes within the VIOS cluster that did not receive the send message.

17. The computer program product of claim 15, the program code further comprising code that causes the first VIOS to perform the functions of:

in response to the send message requiring a response message be generated and returned to the sending daemon:
setting a request for a response message within the sub-header; and
creating a response queue having an entry corresponding to each response message that is to be received for the send message; and in response to receiving a response message, automatically matching the response message to a particular send message entry within the response queue and removing the particular send message entry from the response queue.

18. The computer program product of claim 17, the program code further comprising code that causes the first VIOS to perform the functions of:

receiving a request to generate the send message from a third party caller;

in response to generating the send message for the third party caller, updating the sub-header of the send message to indicate the third party caller as the originating source of the send message;

determining whether a response message was received in response to the send message generated for the third party caller; and in response to the receiving the message to the send message generated for the third party caller, automatically forwarding a response message payload to the third party caller.

19. The computer program product of claim 14, wherein the program code further comprises code that causes the first VIOS to perform the functions of:

in response receiving a second send message from a second daemon, parsing the second send message to determine whether a response message is required in response to the second send message;

in response to determining the response message is required in response to the second send message, generating the response message and forwarding the response message to the VKE via the system call interface; and consuming the message payload within the second send message.

* * * * *